United States Patent Office 2,879,177
Patented Mar. 24, 1959

2,879,177

PROCESS OF SURFACE TREATING POLYETHYLENE STRUCTURES AND RESULTANT ARTICLE

John A. Nelson, Jr., Rochester, N.Y., and Walter K. Vollmer, Allison Park, Pa., assignors to Union Carbide Corporation, a corporation of New York No Drawing. Application August 17, 1954
Serial No. 450,518

6 Claims. (Cl. 117—76)

This invention relates to the treatment of polyethylene surfaces with chlorosulfonic acid whereby the thus treated surfaces can be effectively coated with certain hydrolized polyvinyl esters, polyvinyl ethers or polymethacrylates.

It is well known that normally solid polymers of ethylene and preferably polyethylenes have a molecular weight of about 10,000 and higher can be heat-formed as by extrusion, calendering or molding into such articles as films, sheeting and molded objects such as bottles, carboys and the like. It is also known to prepare polyethylene films by casting a solution of polyethylene in a volatile solvent on smooth surfaces and evaporating the solvent.

For decorative and other purposes, such as reducing polyethylene's permeability to gases, it is often desirable to apply clear or pigmented coating inks and the like to the surface of polyethylene articles, but it has been found that the normal hydrophobic surface of polyethylene prevents satisfactory adhesion thereto of most organic coatings.

It has now been found that coatings based on vinyl chloride-vinyl acetate copolymers which have been sufficiently hydrolized to contain a significant amount of vinyl alcohol groups, or coatings based on polyvinyl alkyl ethers such as polyvinyl ethyl ether, polyvinyl isobutyl ether and the like or polyesters of acrylic acid or methacrylic acid and an aliphatic monohydric alcohol exhibit excellent adhesion to polyethylene surfaces which have been treated by being wetted with or immersed in chlorosulfonic acid for a relatively short time; the acid remaining on the polyethylene surface being then hydrolyzed with water, followed by washing of the polyethylene surface to remove water-soluble reaction products of the chlorosulfonic acid and then drying the treated polyethylene surface. Infra-red spectroscopic analysis of polyethylene thus treated with chlorosulfonic acid indicates a considerable amount of —SO$_2$OH absorption but no evidence of chlorine.

It is believed that the reactions which take place between the polyethylene and the chlorosulfonic acid can be theoretically represented as involving two steps,

A:

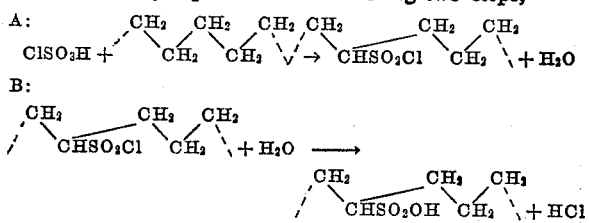

B:

$$\begin{array}{c} CH_2 \\ \diagdown \end{array} \begin{array}{c} CH_2 \\ \diagup \diagdown \end{array} \begin{array}{c} CH_2 \\ \diagup \end{array}$$
/ CHSO$_2$Cl   CH$_2$ \ + H$_2$O ⟶

$$\begin{array}{c} CH_2 \\ \diagdown \end{array} \begin{array}{c} CH_2 \\ \diagup \diagdown \end{array} \begin{array}{c} CH_2 \\ \diagup \end{array}$$
/ CHSO$_2$OH   CH$_2$ \ + HCl Under the usual treating conditions which limit the treatment substantially to the polyethylene surface the chlorosulfonic acid is necessarily present in excess of that which combines with the polyethylene. Hence, some of the water which is inherently formed in step A is competitively consumed in decomposing some of the excess chlorosulfonic acid in accordance with the following reaction: ClSO$_3$H+H$_2$O=H$_2$SO$_4$+HCl.

Accordingly, to insure that the hydrolysis reaction of step B is carried to completion, the polyethylene article after it has been in contact with the chlorosulfonic acid for a sufficient length of time for reaction step A to take place on its surfaces is then washed or immersed in a sufficient amount of water to hydrolyze all the —SO$_2$Cl groups to —SO$_2$OH groups and to decompose the excess or unreacted chlorosulfonic acid remaining on the polyethylene surface to sulfuric acid and hydrochloric acid. Further washing with water or an aqueous solution is desirable to remove all traces of free acids from the polyethylene surfaces.

Considerable exothermic heat is developed in this step of washing with water which may be sufficient to raise the bulk temperature of the polyethylene article to a stress-relieving temperature in the instance of polyethylene articles having thin cross-sections such as polyethylene film and sheeting and thus cause buckling and dimensional distortions.

It has been found that excessive temperature rise of chlorosulfonic acid treated polyethylene articles, particularly those in film or sheet form, can be avoided by exposing the polyethylene article to normal atmospheric moisture for a relatively short time after it has been in contact with the chlorosulfonic acid. During such exposure moisture is absorbed from the air by the chlorosulfonic acid treated polyethylene surfaces at a rate slow enough to prevent temperatures being built up in the article to a level at which stress relieving or heat deformation occurs. Following such air exposure, the treated polyethylene surfaces are then washed with water to complete the hydrolysis of any remaining —SO$_2$Cl groups to —SO$_2$OH groups and to remove all acid residues.

Generally about a one minute exposure time to atmospheric moisture is sufficient to prevent excessive heat build up on thin polyethylene articles such as polyethylene film and sheeting which have been treated with chlorosulfonic acid. Thicker articles, as for example polyethylene bottles having a wall thickness permitting the bottle to be squeezed to eject whatever liquid contents, so-called "squeeze-bottles" show no heat distortion when exposed to atmospheric air for only fifteen seconds prior to washing with water.

It is to be emphasized that the chlorosulfonic acid treatment herein described and claimed is essentially intended only to alter the surface properties of polyethylene sufficiently to render it receptive to certain coatings, but not to effect chlorosulfonation of the interior thickness of the polyethylene article and thus retaining the normal physical and chemical properties of polyethylene. Hence the exposure of the polyethylene article to chlorosulfonic acid is held to a minimum, this being as short as 3 to 30 seconds in the instances of polyethylene film and sheeting and other articles having the normally rough surfaces formed during extrusion or calendering operations. Polyethylene articles having extremely smooth surfaces such as polyethylene sheeting which has been press planished appear to be somewhat resistant to the attack of chlorosulfonic acid and hence may require exposure to the chlorosulfonic acid of upwards to about 30 minutes in order to effect sufficient reaction to impart good reception to coatings. By roughening such polished surfaces, as for example by sand papering, a dipping time of as short as 3 seconds will often be adequate to secure sufficient reaction. The chlorosulfonic acid and polyethylene are ordinarily brought together at room temperatures e. g. 15° C.–50° C. Contact temperatures below 15° C. may be used but may require a somewhat longer exposure to insure sufficient reaction of the polyethylene surfaces. While contact temperatures above 50° C. and up to polyethylene's softening temperature are feasible, the reaction is more vigorous and is apt to cause distortion and other dimensional changes in the polyethylene article.

In most instances the surface treatment of polyethylene articles with chlorosulfonic acid does not cause discoloration of the polyethylene. Where discoloration has been observed, it has been found that this was due to the use of excessively high temperatures in initially forming the polyethylene article. For example, with extruded polyethylene film, it was noted that discoloration resulting from the chlorosulfonic acid treatment became worse as the extruder dye temperature was raised from 250° C. to 325° C. Polyethylene film extruded at 250° C. or lower temperature did not discolor, however, when immersed for 30 seconds in chlorosulfonic acid at room temperature. Despite the discoloration which may occur after the chlorosulfonic acid treatment of thermally abused polyethylene articles, good adhesion is nevertheless had thereto of coatings based on hydrolyzed vinyl chloride-vinyl acetate copolymers, polyvinyl alkyl ethers and polyacrylate esters and polymethacrylate esters.

Coating materials which have been found to adhere exceptionally well to polyethylene surface treated with chlorosulfonic acid as herein described are copolymers of vinyl chloride and vinyl acetate which have been subjected to hydrolysis or alcoholysis whereby a part but not all of the acetate groups on the copolymer chain have been replaced by hydroxyl groups to obtain a copolymer of vinyl chloride, vinyl acetate and vinyl alcohol. The ratio of vinyl chloride to vinyl acetate in the original resin and the degree of hydrolysis or alcoholysis is preferably such that the resin after hydrolysis contained by weight from 70 to 96.5 percent vinyl chloride, from 2.0 to 20 percent vinyl alcohol and from 1.5 to 25 percent vinyl acetate. From the standpoint of solubility in organic solvents, the most useful of these tri-component copolymers are those derived from copolymers of vinyl chloride and vinyl acetate having relative average molecular weights between 5,000 and 25,000 as determined by Staudinger's method (Douglas and Stoops, Industrial Engineering and Chemistry, vol. 28, page 1152, 1936).

The tri-component copolymers of vinyl acetate, vinyl chloride and vinyl alcohol herein found useful are further described as to properties and preparation in Penn et al. U. S. 2,512,726. These copolymers are described by Penn et al. as being compatible with other thermoplastic resins such as the polymers of butyl acrylate, butyl methacrylate, polyvinyl acetate and copolymers of vinyl acetate and vinyl chloride containing from 85 percent to 98 percent vinyl chloride. The tri-component copolymers are in general compatible with more plasticizers than the copolymers of vinyl chloride and vinyl acetate.

The copolymers of vinyl acetate, vinyl chloride and vinyl alcohol in solution in a volatile solvent as for example ketones such as methyl ethyl ketone, methyl amyl ketone, isophorone and cyclohexanone, or esters such as ethyl acetate, butyl acetate, 2-ethylbutyl acetate together with diluents, if desired, such as alcohols or aromatic hydrocarbons form adherent coatings to chlorosulfonic acid treated polyethylene surfaces. Such coatings devoid of any plasticizer may tend to rupture or crack, however, but without loss of adhesion when the polyethylene article is highly extended or flexed.

By incorporating a substantially non-volatile plasticizer in the vinyl acetate, vinyl chloride, vinyl alcohol copolymer, it is possible to formulate coatings having substantially the same degree of extensibility or even more than the polyethylene article to be coated. Generally by using a quantity of an ester-type plasticizer such as di-2-ethyl hexyl phthalate, di (butoxyethyl) dibutyl phthalate, dioctyl sebacate, tricresyl phosphate, triethylene glycol di-2-ethyl butyrate, and polypropylene glycol adipate in an amount equivalent to at least about 15 percent by weight of the copolymer imparts adequate flexibility and extensibility for coating purposes on polyethylene articles. In general a quantity of plasticizer between 15 percent and 30 percent by weight of the copolymer resin can be used in the formulation of coatings having good adhesion and extensibility.

Coatings based on polyvinyl chloride resins or copolymers of vinyl chloride and vinyl acetate do not exhibit satisfactory adhesion to chlorosulfonic acid treated polyethylene surfaces, but by incorporating therewith a sufficient amount of the aforedescribed tri-component copolymer of vinyl acetate, vinyl chloride and vinyl alcohol, good adhesion can be obtained to chlorosulfonic acid treated polyethylene articles. Usually coating compositions containing at least about 20 percent by weight of the tri-component copolymer on the weight of the polyvinyl chloride resin or vinyl chloride-vinyl acetate copolymer resin have been found to produce adherent coatings on treated polyethylene articles.

Coatings based on acrylic and methacrylic esters also seem to have merit as coatings, inks, and overlacquers since they adhere to the treated polyethylene surfaces. The most important commercial resins of this class are sold under the name Acryloids by Rohm and Haas Co. Acryloid B 72 is typical of this class of resin and is reported to be a copolymer of ethyl methacrylate and methyl acrylate. Another resin of this type, acryloid C–10, reputedly a polymer of methyl acrylate also adheres well to the treated polyethylene but not to the untreated material.

The application of a clear coating or lacquer to chlorosulfonic acid treated polyethylene articles is effective in imparting clearer and smoother surfaces over the normal rough and hazy surface produced in heat-shaping molded or extruded polyethylene articles. While it is possible to produce relatively clear untreated polyethylene articles, such as films by extensive heat-processing of the polyethylene resin prior to or during extrusion, or by press-planishing of film or sheeting, such articles and particularly films and sheeting tend to adhere or stick to each other and thus cannot be readily fed through automatic wrapping machines. By treating either rough or smooth polyethylene articles with chlorosulfonic acid, and then applying an adherent clear hydrolyzed vinyl chloride-vinyl acetate copolymer resin or an acrylate coating, one obtains both a smoother surface and a harder surface than normal polyethlene, exhibiting adequate slippage for satisfactory feeding in automatic wrapping machinery.

The chlorosulfonic acid treated polyethylene articles can also be printed or painted with inks or pigmented coatings containing in the vehicle portion a sufficient amount of vinyl acetate-vinyl chloride-vinyl alcohol copolymer resin or acrylate ester to effect satisfactory adhesion.

Insofar as we are cognizant there has not been made heretofore a satisfactory pressure sensitive adhesive tape or film based on polyethylene film or sheeting primarily because of lack of adhesion between the pressure sensitive adhesive and the polyethylene substrate. This difficulty has now been overcome by directly applying to polyethylene tape or film whose surfaces have been treated with chlorosulfonic acid, a coating of an alkyl vinyl ether polymer to function as the pressure sensitive adhesive.

The alkyl vinylether polymers are available as viscous sticky liquids to elastomeric solids depending on conditions of polymerization, and while they have been previously employed as pressure sensitive adhesives on cellophane substrates, they could not be successfully used on normal polyethylene film surfaces in that the polyvinyl alkyl ether had much poorer adhesion thereto than other surfaces such as wood, paper and the like. Consequently, a polyethylene tape coated with such adhesive and applied to a smooth surface such as glass and then stripped therefrom would deposit the polyvinyl alkyl ether on the glass surface. The converse and desirable effect exists with chlorosulfonic acid treated polyethylene coated with a polyvinyl alkyl ether adhesive since under the same stripping condition the adhesive adheres exclusively to the polyethylene substrate and none remains on the glass surface. The same result was had when the adhesive coated polyethylene tape was applied to other surfaces such as metal, wood and linoleum surfaces.

The following examples illustrate further the treatment of polyethylene surfaces with chlorosulfonic acid, and the application of various coatings to the treated surfaces.

Example 1

One mil thick extruded polyethylene film (average Staudinger molecular weight 21,000) having the usual rough extruded surface was dipped in concentrated chlorosulfonic acid (95 percent practical, supplied by Matheson Company, Inc.) for 15 seconds, the acid being at 25° C. The film was then removed from the acid and exposed to air from one to two minutes to initiate hydrolysis of the acid. The film was immediately washed with tap water until all water-soluble acid residues had been removed from the film. The film was then dried at room temperature.

Example 2

The chlorosulfonic acid treated film of Example 1 was then coated by dipping it into a clear lacquer having the following composition:

| | |
|---|---|
| Bakelite resin VAGH [1] | 6.5 |
| Di-2-ethylhexyl phthalate | 0.9 |
| Methyl isobutyl ketone | 46.3 |
| Toluene | 46.3 |
| | 100.0 |

[1] "Bakelite VAGH" is a commercial partially hydrolyzed vinyl acetate-vinyl chloride copolymer containing 3 percent vinyl acetate, 91 percent vinyl chloride and 6 percent vinyl alcohol, the average molecular weight of the copolymer prior to hydrolysis being between 10,000 and 15,000.

After dipping, the lacquer coating was dried for one hour at room temperature. The coated polyethylene film had a smooth, hard, glossy finish and excellent slippage properties. Adhesion of the coating to the treated polyethylene surface was examined by pressing a pressure sensitive adhesive cellophane tape ("Scotch tape") against the coating and then separating the tape from the film; no part of the coating was picked off the polyethylene surface by the adhesive layer of the tape.

Applying the "Scotch tape" adhesion test to untreated polyethylene film coated with the same lacquer described in Example 2 resulted in the lacquer coating being removed from the polyethylene film by the "Scotch tape" adhesive.

Visual observation indicated that the overlacquered film was much clearer than an uncoated control. In addition, gas permeability tests were run on samples of coated and uncoated polyethylene films. The results of these tests show:

| | Gas Permeability, cc./100 sq. in./day | | |
|---|---|---|---|
| | $O_2$ | $N_2$ | $CO_2$ |
| Control | 350 | 130 | 1,500 |
| Coated film of Example 2 | 80 | 14 | 380 |

Example 3

Polyethylene film as in Example 1 was dipped for 30 seconds in 95 percent chlorosulfonic acid at 25° C., then exposed to air for one minute, washed thoroughly with tap water and then dried. The treated film was coated with the clear lacquer of Example 2 and air-dried for one hour. The dried lacquer film could not be removed from the polyethylene surface by adhesion to "Scotch tape." Equally good adhesion to the polyethylene film by this lacquer was had after only a three second dip in chlorosulfonic acid, other treating conditions being the same. When the step of exposing to air was omitted and the film immediately washed with water, severe dimensional distortion of the film occurred, although good adhesion was had of the clear lacquer to the distorted film.

Example 4

Polyethylene film treated with chlorosulfonic acid as described in Example 1 was coated by dipping in the following clear lacquer formulation, all parts being by weight:

| | |
|---|---|
| Bakelite resin VAGH [1] | 3.25 |
| Bakelite resin VYHH [2] | 3.25 |
| Di-2-ethyl hexyl phthalate | 0.9 |
| Methyl isobutyl ketone | 46.3 |
| Toluene | 46.3 |

[1] A partially hydrolyzed vinyl acetate-vinyl chloride copolymer as described in Example 2.
[2] A commercial copolymer of 87% content vinyl chloride and 13 percent content vinyl acetate, specific gravity 1.36 and $n_1$ 0.53 in cyclohexanone at 30° C.

After the lacquer coating had air-dried for one hour, it was tested for adhesion to the polyethylene surface by the "Scotch tape" test. None of the coating was removed from the polyethylene surface by the "Scotch tape."

Applying the same lacquer of Example 4 to ordinary untreated polyethylene film gave a coated material of poor adhesion being easily picked off the polyethylene surface by "Scotch tape."

Lacquers comparable to that employed in Example 4, but with a lower weight ratio of the hydrolyzed copolymer to the "VYHH" copolymer resin exhibited good adhesion to chlorosulfonic acid treated polyethylene films. For example, a lacquer containing as the non-volatile solids 1.6 parts "Bakelite" resin "VAGH," 4.9 parts "Bakelite" resin "VYHH" and 0.9 part di-2-ethylhexyl phthalate satisfactorily passed the "Scotch tape" for adhesion to chlorosulfonic acid treated polyethylene surfaces.

However, coating compositions based on vinyl chloride polymer or vinyl chloride-vinyl acetate copolymers or unsaturated dibasic acid modified vinyl chloride-vinyl ester copolymers and containing none or less than 20% by weight of hydrolized vinyl acetate-vinyl chloride copolymer resin do not adhere adequately to treated or untreated polyethylene surfaces. For instance, a clear lacquer containing as the non-volatile solids 1.3 parts "VAGH" hydrolyzed vinyl acetate-vinyl chloride copolymer resin, 5.2 parts "VYHH" vinyl acetate-vinyl chloride copolymer resin and 0.9 part di-2-ethylhexyl phthalate adhered spottily to the treated polyethylene film of Example 1 when subjected to the "Scotch tape" test.

Substituting for the "VYHH" copolymer resin in the coating of Example 4 an equal amount of "Vinylite VMCH" resin, a commercial vinyl chloride-vinyl acetate copolymer resin modified by a 1 percent quantity of an interpolymerized dibasic unsaturated acid, e.g. maleic acid also yielded a lacquer which adhered satisfactorily to the chlorosulfonic acid treated film of Example 1. The properties and preparation of dibasic acid modified vinyl copolymer resins are described by Campbell 2,329,456.

Example 5

Polyethylene film treated with chlorosulfonic acid as described in Example 1 was coated with a clear solution consisting of:

| | |
|---|---|
| "Acryloid B-72" (40 percent non-volatile) parts | 25 |
| Toluene do | 125 |
| Total parts by weight | 150 |

"Acryloid B-72" is a solution in toluol of methyl acrylate and ethyl methacrylate polymers and is sold by Rohm and Haas Company. The coating after being air-dried for one hour and then tested by means of "Scotch tape" exhibited satisfactory adhesion to the treated polyethylene surface.

Example 6

Polyethylene film treated with chlorosulfonic acid as described in Example 1 was coated with a clear solution consisting of:

| | |
|---|---|
| "Acryloid C-10" (20% non-volatile) parts | 50 |
| Ethyl acetate do | 100 |
| Total parts by weight | 150 |

"Acryloid C-10" is a solution in ethyl acetate solvent of polymethyl acrylate polymer and is sold by Rohm and Haas Company.

The coating after being air-dried for one hour and then tested by means of "Scotch tape" exhibited satisfactory adhesion to the treated polyethylene surface. It was observed that the coating had a slight surfacetack which persisted after air drying 24 hours.

Example 7

A polyethylene film treated with chlorosulfonic acid as described in Example 1 was printed by the silk screening technic with a red-pigmented coating of the following composition:

| | Parts by weight |
|---|---|
| Bakelite "VAGH" resin | 10 |
| Di-2-ethyl hexyl phthalate | 2.0 |
| Cadmium red | 5.0 |
| Methyl isobutyl ketone | 41.5 |
| Toluol | 41.5 |
| | 100.0 |

After drying the printed coating for one hour it was tested with "Scotch tape." Under these test conditions the printed matter did not strip off the treated polyethylene surface.

Example 8

The clear lacquer coated film of Example 2 was printed with the same printing ink composition described in Example 7. The adhesion of the ink to the lacquer coating, and the coating to the polyethylene surface by means of "Scotch tape" was found satisfactory and intact after removal of the "Scotch tape."

Example 9

A pressure sensitive adhesive tape was prepared by coating polyethylene film (treated with chlorosulfonic acid as described in Example 1) with a solution of 15 parts by weight of "Bakelite Resin EXBM," which is a polyvinyl ethyl ether resin and 85 parts methyl ethyl ketone as solvent. After air drying the coating for one hour, the coated polyethylene film was found to adhere satisfactorily when pressure applied to such diverse surfaces as wood, metal and glass. The polyethylene film could be satisfactorily stripped from these surfaces for reuse since the polyvinyl ethyl ether resin continued to adhere to the polyethylene surface after such stripping. Resin EXBM has a reduced viscosity between 3.5 and 4.5 as measured at 0.5 gm. resin/100 ml. of benzene at 20° C.

Example 10

A bottle injection molded of polyethylene (average molecular weight 21,000) was partially submerged in chlorosulfonic acid at room temperature for 15 seconds, then exposed to air for 15 seconds and then thoroughly washed with water. The bottle showed no distortion after washing, indicating that the amount of heat generated during water washing was insufficient to cause heat-warping of 0.015 inch thick walls. The treated and untreated surfaces of the bottle were then coated with an aluminum pigmented finish having the following composition:

| | |
|---|---|
| Bakelite "VAGH" resin parts | 10.0 |
| Di-2-ethyl hexyl phthalate do | 1.0 |
| Aluminum powder do | 5.0 |
| Methyl isobutyl ketone do | 42.0 |
| Toluol do | 42.0 |
| Total parts by weight | 100.0 |

The coating when tested with "Scotch tape" as described in Example 2 stripped away from those polyethylene surfaces of the bottle which had not been in contact with the chlorosulfonic acid, whereas the coating over the treated surfaces remained firmly adherent thereto.

What is claimed is:

1. Polyethylene article characterized by a surface of polyethylene containing —SO$_2$OH groups in amount detectable by infra-red spectroscopic analysis, said surface being free from chlorine and chlorosulfonic groups.

2. Polyethylene article characterized by a surface of polyethylene containing —SO$_2$OH groups in amount providing for adhesion of said surface to resinous coatings selected from the group consisting of partially hydrolyzed vinyl acetate-vinyl chloride copolymer, polyvinyl alkyl ethers and esters of acrylic acid and methacrylic acid, said surface being free from chlorine and chlorosulfonic groups.

3. Coated polyethylene article comprising polyethylene having a surface free from chlorine and chlorosulfonic groups and containing —SO$_2$OH groups in amount detectable by infra-red spectroscopic analysis and on said surface an adherent resinous coating selected from the group consisting of partially hydrolyzed vinyl acetate-vinyl chloride copolymer, polyvinyl alkyl ethers and esters of acrylic acid and methacrylic acid.

4. A pressure sensitive adhesive film comprising polyethylene having a surface free from chlorine and chlorosulfonic groups and containing —SO$_2$OH groups in amount detectable by infra-red spectroscopic analysis and on said surface an adherent coating of a polyvinyl alkyl ether.

5. Process for modifying the surface of polyethylene articles which comprises contacting the polyethylene surface with chlorosulfonic acid, and then hydrolyzing the chlorosulfonic acid in contact with the polyethylene to form a polyethylene surface containing —SO$_2$OH groups.

6. Process for modifying the surface of polyethylene articles which comprises contacting the polyethylene surface with chlorosulfonic acid, exposing the chlorosulfonic acid in contact with the polyethylene surface to moisture-containing air to cause hydrolysis of the chlorosulfonic acid and then water-washing to remove water-soluble acid residues.

References Cited in the file of this patent

UNITED STATES PATENTS

| | | |
|---|---|---|
| 2,632,921 | Kreidl | Mar. 31, 1953 |
| 2,639,998 | Pavlic | May 26, 1953 |